_United States Patent_ [19]

Riondel

[11] Patent Number: 4,588,932
[45] Date of Patent: May 13, 1986

[54] SLIP-LIMITING CONTROL FOR RAIL VEHICLES

[75] Inventor: Pierre Riondel, Geneva, Switzerland

[73] Assignee: BBC Brown, Boveri & Company, Ltd., Baden, Switzerland

[21] Appl. No.: 650,501

[22] Filed: Sep. 14, 1984

[30] Foreign Application Priority Data

Sep. 28, 1983 [CH] Switzerland .................... 5251/83

[51] Int. Cl.$^4$ .................... B61C 15/08; B60T 8/00
[52] U.S. Cl. .................... 318/52; 180/197; 303/99; 303/107
[58] Field of Search .................... 318/52; 364/426; 180/197; 303/20, 99, 105, 107; 246/23, 62

[56] References Cited

U.S. PATENT DOCUMENTS

| 4,032,197 | 6/1977 | Kohler | 180/197 X |
| 4,075,538 | 2/1978 | Plunkett | 180/197 X |
| 4,164,872 | 8/1979 | Weigl | 180/197 X |
| 4,358,164 | 11/1982 | Bleckmann et al. | 364/426 X |
| 4,435,768 | 3/1984 | Arikawa | 364/426 |

FOREIGN PATENT DOCUMENTS

| 0089899 | 9/1983 | European Pat. Off. | 318/52 |
| 2006349 | 9/1970 | Fed. Rep. of Germany . | |

_Primary Examiner_—William M. Shoop, Jr.
_Assistant Examiner_—Bentsu Ro
_Attorney, Agent, or Firm_—Oblon, Fisher, Spivak, McClelland & Maier

[57] ABSTRACT

A method and device for slip-limiting control on a rail vehicle wherein for controlling or limiting slip, it is necessary to determine the actual speed of the rail vehicle. The invention overcomes the problems in traction vehicles such as, for example, locomotives which only have driving wheels and no running wheels, especially if all driving wheels slip simultaneously. For the accurate determination of the vehicle speed, the traction motor current for the associated motor is reduced for a short period, of about 3 s, at the driving wheel which is rearmost in the direction of motion, by means of a slip-reduction signal which is supplied to a slip-limiting controller which also reduces the speed of this driving wheel so that this wheel no longer slips and its peripheral wheel speed is equal to the vehicle speed. During a presettable long-term period of about 25 s, all slip-limiting controllers of the rail vehicle are preset with a speed reference signal ($v_{ref}$) having a slight rise in speed so that the peripheral wheel speed of the driving wheel is somewhat greater than the vehicle speed but not great enough for the wheels to spin. A jolt detector is provided for intializing this measure.

8 Claims, 3 Drawing Figures

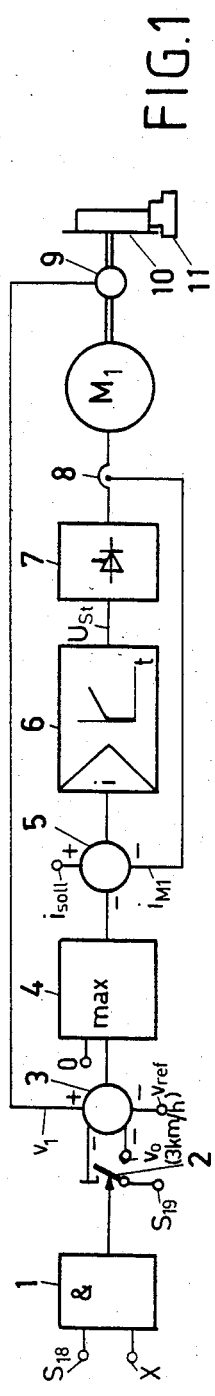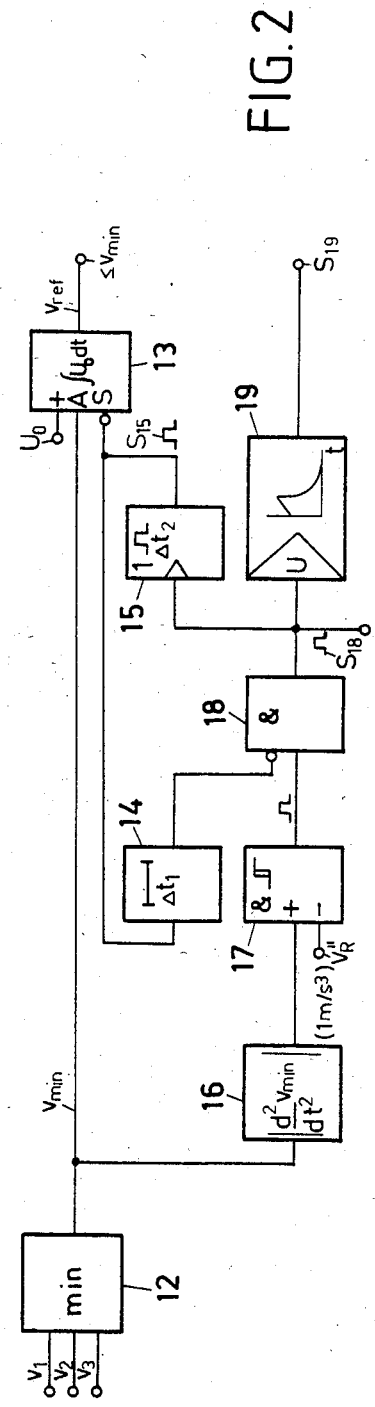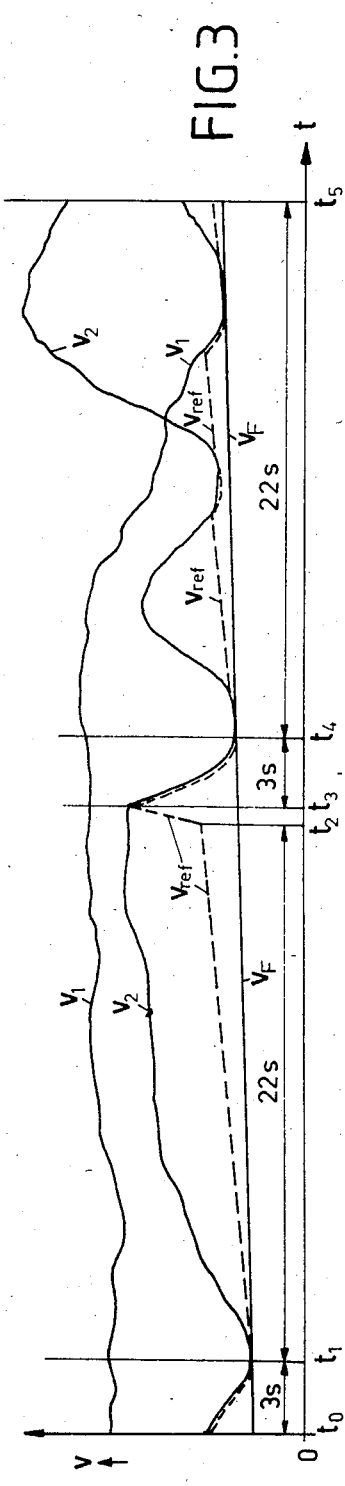

SLIP-LIMITING CONTROL FOR RAIL VEHICLES

BACKGROUND OF THE INVENTION

1. Field of the Invention

This invention relates to a method for controlling or limiting the slip of a rail vehicle having at least two driving machines, each driving machine associated with a respective slip-limiting controller, wherein a nominal current value is varied as a function of the difference between a peripheral wheel speed derived from a driving axle of the respective machine and a presettable slip-limit value. The invention also relates to a slip-limiting control device for carrying out the method.

2. Description of the Prior Art

Prior art slip-limiting methods are described in the Swiss House Journal Brown Boveri Mitteilungen (1976), pages 160–167. In this journal, a speed controller for thyristor-controlled locomotives is specified in which the traction-motor current follows a nominal control value virtually without delay by means of phase-angle control. This nominal control value is supplied by a control loop including a Proportional-Integral-Derivative, or PID speed controller. The control loop is supplied at the input with a speed difference signal $\Delta v =$ nominal speed value (entered at the driver's desk) - actual speed value (obtained from a trailing bogie) and a $d\Delta v/dt$ signal formed by differentiation from $\Delta v$. In addition, in the control circuit a section is provided which slows down the build-up of the nominal current value to the extent that the change in acceleration of the train does not exceed a value of 0.6 m/s$^3$ in order to avoid unpleasantly high accelerations for the passengers, to reduce load peaks in the supply system and to lower the overall energy consumption. The maximum current can be set by the vehicle driver at the driver's desk due to the fact that the nominal current value is limited at the speed controller.

In addition, an electronic anti-spin protection is provided which acts, via the current controller of the slipping bogie drive, on the traction-motor current when the slip between wheel and rail as a result of deteriorated conditions of adhesion exceeds 1.5% of the train speed. By slip, in this case the relative speed between wheel and rail is meant, that is to say the difference between the peripheral speed of the wheel and the train speed which would be accurately measureable, for example with a non-driven so-called running axle. In addition, a control loop exists which causes a rapid reduction in current when the acceleration of a wheelset exceeds 0.8 m/s$^2$. This loop comes into effect when the conditions of adhesion suddenly deteriorate, for example when passing over a set of points.

However, modern traction vehicles are no longer equipped with a running axle. It has been considered adequate to base the determination of train speed on the axle having the smallest rotational speed or to determine it as an integral of the train acceleration and to calculate the train acceleration from tractionmotor current, train mass and the sum of the tractive resistances, with reference to which see also DE-OS No. 25 31 032 which corresponds to U.S. Pat. No. 4,065,975.

The frictional connection between the driving wheel and the rail changes within wide limits as a function of the coefficient of friction which, as a rule, is different for each axle, and thus the slip also changes. With increasing slip, the transferable traction force decreases after a maximum of adhesion has been exceeded and the driving wheels spin which causes increased wear to occur at the wheel and the rail and self-excited frictional vibrations between the traction motor and the wheelset and the two wheel discs on one axle. In order to transfer a maximum of traction force to the driving wheels, the slip in rail vehicles should be some km/h, that is to say all driven wheels should slip a little. On the other hand, the train speed cannot be determined as a function of the rotational speed of the axle if all driven wheels slip simultaneously.

SUMMARY OF THE INVENTION

Accordingly, one object of this invention is to provide a novel method for controlling slip, wherein it is possible accurately to determine the speed of a rail vehicle as a function of the rotational speed of one driving wheel and to prevent the driving wheels from spinning.

Another object is to provide novel slip-limiting control device which is adapted for carrying out the method of the invention.

One advantage of the invention consists in that, in the determination of the vehicle speed, a measuring accuracy is achieved which is adequate for practical purposes since in the case of a driving wheel selected for measuring the vehicle speed, slipping is eliminated at least for a brief period so that no slip occurs between wheel and rail. The peripheral speed of the wheel is then equal to the vehicle speed. For this purpose, the traction force must be reduced for a brief period only for one driving wheel. During a long-term period including this short-term period, a speed reference value is preset on each slip-limiting controller for each machine drive, which reference value allows the vehicle speed to rise only very slowly, thus preventing the driving wheels from spinning.

According to an advantageous embodiment of the invention, the traction force is removed for vehicle speed measurement only when a selected driving wheel begins to spin, that is to say when the change with time of the acceleration of the wheel periphery exceeds a presettable limit value, ideally only in the case of the drive machine which is the rearmost in the direction of motion. The vehicle can thus be driven almost with optimum frictional connection between wheel and rail.

The circuit for achieving the desired results is relatively small, including essentially a short-term period and a long-term period signal transmitter which supply signals to a current (or torque) controller, known per se. The additional circuit may be produced with few standard components and requires little space. Only measurement signals such as must already exist in the previously known anti-spin protection devices are needed for further processing.

Particularly advantageous for the rapid and reliable detection of unacceptably high slip of a driving wheel is the use of a jolt detector which detects jolt-like wheel motions which may then be monitored for exceeding a limit value.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIG. 1 is a block diagram of a slip-limiting and current controller for a driving machine of a rail vehicle, FIG. 2 is a block diagram of a circuit arrangement for determining jolt-like motions which occur simultaneously in all driving wheels and for generating short- and long-term period signals to apply to the slip-limiting controller of FIG. 1, and FIG. 3 is a speed/time diagram for two driving wheels in the presence of slip.

DESCRIPTION OF THE PREFERRED EMBODIMENTS

The invention relates to the slip-limiting control of a rail vehicle, not shown, for example of an electrically driven locomotive which has several driving machines or driving motors $M_1$. Each driving machine acts via a driving axle onto at least one driving wheel 10, in general onto a driving wheel-set, not shown. Each driving machine is associated with a slip-limiting controller according to FIG. 1.

The slip-limiting controller shown in FIG. 1 includes a speed-summing section 3 which is supplied via a "+" input with a peripheral wheel speed signal $v_1$ and, via respective "−" inputs, with a speed reference signal $v_{ref}$, a presettable slip-limit speed signal $v_o$, corresponding to a speed of preferably 3 km/h, and, via an electronic switch 2, with a slip-reduction signal $S_{19}$. The switch 2 is switched by means of an AND gate 1 as a function of a short-term period signal $S_{18}$ and of a reference motor signal X which is set to a logical "1" at the motor which is the rearmost in the direction of motion of the rail vehicle and is set to a logical "0" at all other motors or driving machines. The switch 2 is closed when both input signals of the AND gate 1 are at a logical "1". The short-term period signal $S_{18}$, the speed reference signal $v_{ref}$ and the slip-reduction signal $S_{19}$ are supplied by the circuit arrangement of FIG. 2.

The output of the speed summing section 3 is connected to one input of a maximum-value section 4. To another input of this maximum-value section 4, a "0" signal is applied so that the output signal of the maximumvalue section can only be greater than or equal to 0.

The output of this maximum-value section 4 is connected to one "−" input of this current summing section 5. A further "−" input of this current summing section 5 is connected to the output of a current meter 8 which supplies an actual current signal $i_{M1}$ of the motor $M_1$. A "+" input of the current summing section 5 is supplied with a nominal current signal $i_{soll}$. This nominal current signal $i_{soll}$ is preset in known manner, for example by a speed controller, see for example Brown Boveri Mitteilungen (1976), page 162, as a function of presettable maximum values of, for example, traction motor current and vehicle speed. The $i_{soll}$ may also originate directly from a nominal-value potentiometer as, for example, is shown in Canadian Pat. No. 950,559.

The output signal of the current summing section 5 is fed to the input of a current controller 6 having a proportional-integral, or PI, characteristic and which at its output supplies a control voltage signal $U_{St}$ to a static converter and the associated control device 7. This static converter 7 controls the traction motor current of the motor or driving machine $M_1$ as a function of this control voltage signal $U_{St}$.

The shaft of the motor $M_1$ is rigidly coupled to a tachometer generator 9 the output of which supplies the peripheral wheel speed signal $v_1$ which is proportional to the rotational speed of the motor shaft. Via the motor shaft, simultaneously at least one driving wheel or one driving wheelset 10 of the rail vehicle is driven which may roll or, with the transmission of high traction force, slip on a rail 11.

The circuit arrangement of FIG. 2 is provided with a minimum-value section 12 the input of which is supplied with all peripheral wheel speed signals $v_1$, $v_2$, $v_3$, . . . which are derived from the driving wheels or driving wheelsets driven by motors $M_1$ . . . .

The output of the minimum-value section 12 supplies a minimum speed signal $v_{min}$ which, on the one hand, is supplied to the initialization input A of an integrator 13 and, on the other hand, to the input of a jolt detector or a dual differentiating section with total value formation 16, which at its output supplies a signal which is proportional to $|d^2v_{min}/dt^2|$. This output signal of the jolt detector 16 is fed to the "+" input of a two-input threshold section or Schmitt trigger 17. The second input, an inverting input, is supplied with a presettable jolt threshold signal $v_R''$, corresponding to a jolt of preferably 1 m/s$^3$. The Schmitt trigger 17 generates at its output a binary "1" signal for as long as the signal at its "+" input is greater than the signal at its inverting or "−" input.

The output signal of the Schmitt trigger 17 is supplied to one input of an AND gate 18 which has a second inverted input connected to the output of a timing section including a response delay circuit 14, having a presettable response lag $\Delta t_1$ of preferably 3 s. The output of the AND gate 18 is connected to one input of the AND gate 1, see FIG. 1, to an input of a PI controller 19 and to a trigger input of a mono-stable flip-flop 15 from which the short-term period signal $S_{18}$ can be obtained. This is a binary "1" signal having a maximum duration of $\Delta t_1$.

The PI controller 19 is provided with a built in nominal-value generator and, at its output, supplies the slip-reduction signal $S_{19}$ which is fed to the switch 2 in FIG. 1. Integration takes place during the duration of the short-term period signal $S_{18}$. After that, the voltage U of the slip-reduction signal $S_{19}$ drops relatively quickly, and disappears preferably within 12 s.

The mono-stable flip-flop 15 generates at its output the long-term period signal $S_{15}$ which is a binary "1" signal having a presettable long-term period $\Delta t_2$ of preferably 25 s. This long-term period signal $S_{15}$ is applied, on the one hand, to the input of the timing section 14 and, on the other hand, to the set input S of the integrator 13.

The integrator 13 is supplied at one "+" input with a presettable small initial voltage $U_o$, corresponding to a rise in the speed reference signal $v_{ref}$ at the output of the integrator of preferably 0.1 m/s$^2$. Voltage $U_o$ is integrated during the long-term period $\Delta t_2$ of the long-term period signal $S_{15}$. The integrated signal is compared with $v_{min}$, and if it exceeds the value of $v_{min}$, the output signal is $v_{ref}=v_{min}$. After integration has been completed, $v_{ref}$ is rapidly brought to the value of $v_{min}$ if $v_{ref} \neq v_{min}$. Such an integrator, having the operating modes of integration, hold, set initial comdition, is known, for example, from the German book by U. Tietze, Ch. Schenk, Halbleiter-Schultungstechnik (Semi-conductor circuit techniques), 5th edition, Springer-Verlag, Berlin-Heidelberg-New York, 1980, page 199, FIG. 11.9.

For a vehicle only one circuit as shown in FIG. 2 is required, while each motor of the vehicle requires a circuit of FIG. 1. The output signals $S_{18}$, $S_{19}$ and $v_{ref}$ are supplied to all slip-limiting controllers according to FIG. 1.

The action of the circuit according to the invention, in accordance with FIGS. 1 and 2, will now be explained with the aid of the speed/time diagram of FIG. 3 in which v is the speed and t is the time. The vehicle speed $V_F$, which is the speed reached at the end of the short time period $\Delta t_1$ and the peripheral wheel speed $v_1$ and $v_2$ of two driving wheels 10 are shown as a continuous line and the speed reference value $v_{ref}$ as a dashed line. For the sake of simplicity, the physical magnitudes and the signals associated with them have been given the same designations.

Before discussing FIG. 3 in detail, next provided is an overview of the operation of the present invention. If the slippage between wheel and rail exceeds a presettable value, the engine torque of a wheel set of the vehicle, preferably of the last wheel set, is instantly, i.e. within 3 seconds, reduced. As a result, the slippage is reduced to zero, so that the wheel circumferential speed ($v_2$) of the wheel set is equal to the vehicle speed $v_F$, at time $t_1$ in FIG. 3. Starting from this time $t_1$, the speed reference value $v_{ref}$ is preset with a presettable slight gradient of 0.1 m/sec$^2$ during a long term period $t_2-t_1$ (or $\Delta t_2$) of 22 seconds. Thereafter, $v_{ref}$ is quickly, i.e., within $t_3-t_2$, brought to the speed minimum value, $v_{min}$, in FIG. 3 to the value $v_2$. The reference value $v_{ref}$ is thereafter always followed by the minimum value of wheel speed $v_{min}$ until a new long term period $\Delta t_2$ starts at $t_4$.

At time $t_o$, the peripheral wheel speeds $v_1$ and $v_2$ are greater than the vehicle speed $v_F$ which rises very slowly. Consequently the driving wheels are slipping. At time $t_o$, the Schmitt trigger 17 has responded with a "1" signal at its output since the output signal of the jolt detector 16 is greater than the predetermined jolt-threshold signal "$v_R$". Since the jolt detection is derived by dual differentiation from the minimum speed value $v_{min}$, all driving wheels are consequently slipping simultaneously. The output signal of the timing section 14 is a logical "0" so that the AND gate 18, on arrival of a "1" signal from the Schmitt trigger 17, supplies at its output a short-term period signal $S_{18}=$"1". Via the trigger input of the mono-stable flip-flop 15, this signal produces at the output of the latter a long-term period signal $S_{15}=$"1". This long-term period signal $S_{15}$ appears via the response delay circuit 14 with a delay of a presettable response lag $\Delta t_1=3$ s at the negated input of the AND gate 18, so that the output signal of the latter assumes the value "0". $S_{18}$ is at "1" for as long as the output signal of the Schmitt trigger 17 is at "1" but at a maximum only during the response lag $\Delta t_1$. As long as $S_{18}=$"1", the PI controller 19 will integrate and supply the slip-reduction signal $S_{19}$ to the input of switch 2 of all slip-limiting controllers.

The speed reference signal $v_{ref}$ at the output of the integrator 13 is always $\leq v_{min}$. As soon as $S_{15}=$"1", $v_{ref}$ can rise only very slowly, and that with a presettable slope, but can never become greater than $v_{min}$.

At time $t_o$, $v_2=v_{min}$. Let the wheelset associated with $v_2$ be the rearmost in the direction of motion. For the associated speed controller, the reference motor signal X is set to "1" so that its AND gate 1 is prepared for supplying a switching signal for the switch 2 as soon as a short-term period signal $S_{18}=$"1" arrives. For this speed controller, the slip-reduction signal $S_{19}$ is now supplied to the speed summing section 3 for as long as $S_{18}=$"1". During this time of 3 s, the traction force of the associated motor is reduced by means of its slip-limiting controller to such an extent that the slip of the associated driving wheel disappears and the speed $v_2$ becomes equal to the vehicle speed $v_F$ at time $t_1$. The slip-reduction signal $s_{19}$ has no effect on the other speed controllers since their reference motor signal X="0"; $v_1$ is affected only via $v_{ref}$.

At time $t_1$, consequently the vehicle speed $v_F$ may be accurately determined which is an object of the invention.

Since at time $t_o$, the integrator 13 has been set by the long-term period signal $S_{15}=$"1", $V_{ref}$, although it may drop rapidly corresponding to $v_{min}$ during the presettable long-term period $\Delta t_2$ of 22 s, may rise only slowly up to time $t_2$ after which a fast rise takes place to $v_{min}=v_2$ at time $t_3$.

At this time $t_3$, the Schmitt trigger 17 responds again and the speed rapidly drops from $v_2$ to the $v_F$ value within 3 s up to time $t_4$. After that, $v_2$ rises relatively steeply but $v_{ref}$ only with a presettable slope. However, $v_{ref}$ may never become greater than $v_{min}$. This is the case once with $v_2$ and once with $v_1$ in the interval between $t_4$ and $t_5$.

It is desirable that the values of $v_1$ and $v_2$ should be always a little but not too much above the value $v_F$ in order to be able to transfer the maximum possible traction force. This is successfully achieved by the low rise of $v_{ref}$, which simultaneously prevents the driving wheels from spinning. The relatively short-term reduction in traction force during about 10% of the motion time with periodic reduction at only one driving wheel causes little disturbance in this connection. It makes it possible accurately to determine the vehicle speed $v_F$ and to achieve reliable control of rail vehicle speed.

Naturally, the invention is not restricted to the circuits shown in the Figures. Thus, for example instead of the PI controllers 6 and 19, proportional-integral-Derivative of PID controllers may also be used. It is important that the peripheral wheel speed is reduced for a brief period at one driving axle, so that this driving wheel rolls and does not slip, for the determination of the vehicle speed, and that during a presettable long-term period, a speed reference signal is preset which has a slight rise in speed (greater than the vehicle speed). As the speed rises, a value could also be preset which has been measured previously, i.e. during slip-free operation (jolt detector did not respond) and stored on occurrence of the jolt signal, but reduced by some 10%. It is of advantage to use a jolt detector for initializing these measures.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A method for limiting slip on a rail vehicle having at least two driving machines, wherein each driving machine is associated with a respective slip-limiting controller and in each slip-limiting controller a nominal current value ($i_{soll}$) is varied as a function of the difference between a peripheral wheel speed derived from a driving axle of the respective driving machine, and a presettable nominal slip limit value, comprising:

eliminating slipping between a driving wheel and a rail in the case of the driving wheels of at least one of said driving machines within a presettable short-term period ($\Delta t_1$):

presetting during a presettable long-term period ($\Delta t_2$) a speed reference value ($v_{ref}$) as a slip-limiting control value of each driving machine, said speed reference value ($v_{ref}$) corresponding to a very slow speed increase of the rail vehicle;

rapidly bringing the speed reference value ($v_{ref}$) to a minimum speed value, $v_{min}$, if $v_{ref} \neq v_{min}$, where $v_{min}$ is equal to the wheel circumferential speed of the slowest driving wheels; and maintaining $v_{ref} = v_{min}$ until a further slipping occurs.

2. A method according to claim 1, comprising:

eliminating the slipping between said driving wheel and said rail as a function of a limit value of the change with time of the acceleration of the wheel periphery ($d^2v/dt^2$) of at least one driving wheel being exceeded; and using the change with time of the acceleration of the wheel periphery of the driving wheel having the smallest peripheral wheel speed ($d^2v_{min}/dt^2$) for detecting whether the limit is being exceeded.

3. A method according to claim 2, comprising:

eliminating slipping by rapidly reducing the driving current of only one driving machine, that being the driving machine of the driving wheel which is rearmost in the direction of motion.

4. A slip-limiting control device for a rail vehicle having at least two driving machines, wherein each driving machine includes a slip-limiting controller which controls the speed of at least one wheel, driven by the driving machine, as a function of the difference between a peripheral wheel speed derived from a driving axle of the driving machine, and a presettable nominal slip value, and at least one speed summing section, comprising:

a short-term period signal generator for generating a slip-reduction signal, said slip-reduction signal effectively connected, during one short-term period, to the speed summing section of at least one of said slip-limiting controllers, in order to reduce the peripheral wheel speed of the associated driving wheel, the peripheral wheel speed being reduced during this short-term period to such an extent that said driving wheel no longer slips on said rail;

a long-term period signal generator for generating a speed reference signal ($v_{ref}$) which has during a presettable long-term period a value which rises very slowly;

said long-term period signal generator having an output coupled to an input of the speed summing section in such a way as to produce a reduction in the peripheral wheel speed; and means for rapidly bringing said speed reference signal $v_{ref}$ to a minimum speed value, $v_{min}$ if $v_{ref} \neq v_{min}$, where $v_{min}$ is equal to the wheel circumferential speed of the slowest driving wheels, where $v_{ref} = v_{min}$ is maintained until a further shipping occurs.

5. A slip-limiting control device according to claim 4, comprising:

a jolt detector for detecting the amount of change with time of the acceleration ($d^2v_{min}/dt^2$) of the wheel periphery, said jolt detector having an input supplied with at least one peripheral wheel speed signal of at least one driving wheel of the rail vehicle;

a jolt threshold section coupled to an output of said jolt detector, said threshold section having a presettable jolt threshold and producing an output coupled to the short-term period signal generator when said presettable jolt threshold is exceeded; and a minimum value section having inputs supplied with plural peripheral wheel speed signals from plural respective driving wheels of the rail vehicle and an output at which said minimum speed signal ($v_{min}$) is present, said output of said minimum value section coupled to said input of the jolt detector.

6. A slip-limiting control device according to claim 5, comprising:

said short-term period signal generator comprising a proportional-integral controller which generates the slip-reduction signal as a function of a short-term period signal, said short term signal being enabled as a function of the output of the jolt threshold section; and said short-term period signal having a duration of less than or equal to 3 s.

7. A slip-limiting control device according to claim 6, wherein said long-term period signal generator comprises:

a mono-stable flip-flop which generates a long-term period signal with a presettable long-term period as a function of the short-term period signal, said long-term period being about 25 s; and an integrator which generates the speed reference signal as a function of said long-term period signal, said integrator having an input supplied with the minimum speed signal ($v_{min}$), said minimum speed signal being present as the speed reference signal ($v_{ref}$) at the output of the integrator if no long-term period signal is present, and said minimum speed signal ($v_{min}$) being the upper limit for the speed reference signal ($v_{ref}$) if said long-term period signal is present.

8. A slip-limiting control device according to claim 7, comprising:

said speed summing section connected via a "+" input to the peripheral wheel speed signal of the driving wheel associated with the speed controller, via a "−" input to a presettable slip-limit speed signal ($v_o$), via another "−" input to the speed reference signal ($v_{ref}$), and via another "−" input to the slip reduction signal;

said speed summing section connected via a maximum value section having a reference value "0" to a "−" input of a current summing section, which is supplied via another "−" input with an actual current value signal of the associated driving machine and via a "−" input with a nominal current value signal; and the output of the current summing section connected via a current control to a static converter for supplying the driving machine with power.

* * * * *